July 7, 1970  L. E. HECKATHORN ETAL  3,519,085
ADJUSTMENT APPARATUS FOR OFFSET DISC TILLERS
Filed Aug. 8, 1966  2 Sheets-Sheet 1
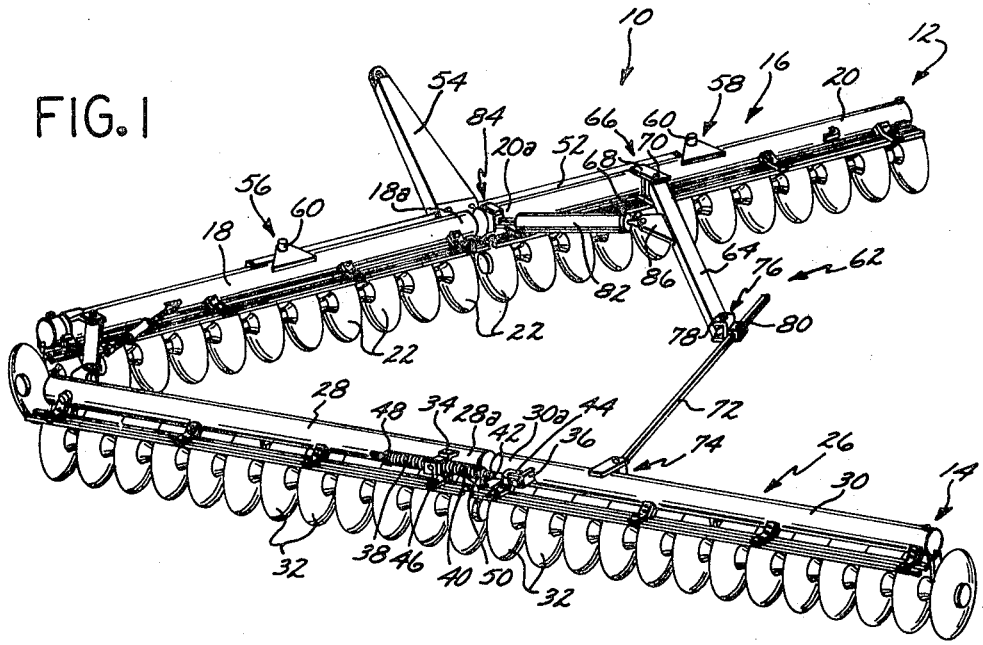
INVENTOR.
LOYD E. HECKATHORN
HUGH B. CORDES
BY
ATTORNEY

INVENTOR.
LOYD E. HECKATHORN
HUGH B. CORDES
BY
ATTORNEY

United States Patent Office 3,519,085
Patented July 7, 1970

3,519,085
ADJUSTMENT APPARATUS FOR OFFSET
DISC TILLERS
Loyd E. Heckathorn and Hugh B. Cordes, Garden Grove, Calif., assignors to Towner Manufacturing Company, Santa Ana, Calif., a corporation of California
Filed Aug. 8, 1966, Ser. No. 570,984
Int. Cl. A01b 21/00
U.S. Cl. 172—597      7 Claims

ABSTRACT OF THE DISCLOSURE

This invention is for adjusting the relative position of forward and rearward disc units of a disc tiller.

It comprises connecting means between the disc units comprising a first clevis fixed to one end of one unit and a second clevis rotatably mounted on one end of the other unit. A connector is pivotally secured to both of said clevises and an adjustable link is interposed between such connector and one of the disc units.

---

The present invention relates generally to adjustment apparatus for offset disc tillers, and more particularly to apparatus for changing the physical relationship between angularly offset disc units of a disc tiller.

Offset disc tillers have been used for a considerable period of time in working the soil or ground for subsequent plantings or for working certain surface materials into the ground. Most frequently, such units are drawn or pulled by a tractor or other motive power means, the discs being drawn through the upper layer of ground to accomplish the necessary digging and turning of the earth or ground.

Offset disc tillers comprise forward and rearward disc units which are set at an angle to each other. The discs of the forward unit turn the ground in one direction while the discs of the trailing or rearward unit turn the ground in the opposite direction. Typically, the forward unit turns the ground to the right and the rearward unit turns the ground to the left.

The objective of such procedure is to "work" the ground in a digging and turning manner, but to leave the ground in a relatively level, flat condition. To accomplish this, the discs of the forward unit in turning the ground to the right provide certain troughs or furrows which are to be filled by the second or rearward unit.

Thus, the alignment of the rearward and forward units is relatively critical in that the trailing discs must be so oriented with respect to the forward discs as to fill the furrows left by the forward discs.

Heretofore, such alignment or adjustment has been accomplished in a very rough manner so that prior devices have not been particularly successful in leaving the land relatively level and flat.

It is an object of the present invention to provide for an offset disc tiller adjustment apparatus for varying the relationship between the discs of the forward and rearward disc units.

Another object of the present invention is to provide adjustment apparatus as characterized above which is operable to afford infinite adjustment within predetermined relatively wide limits.

A further object of the present invention is to provide adjustment apparatus as characterized above which can be operated efficiently and in a simple manner in the field by a relatively unskilled operator.

A still further object of the present invention is to provide adjustment apparatus as characterized above wherein all of the rearward discs are simultaneously moved with respect to all of the forward discs.

Another further object of the present invention is to provide adjustment apparatus for an offset disc tiller as characterized above which is operable for any offset relationship of the forward and rearward disc units.

An even further object of the present invention is to provide adjustment apparatus as characterized above which is operable in conjunction with fluid pressure operated means for varying the degree of offset of such forward and rearward disc units.

A still further object of the present invention is to provide adjustment apparatus as characterized above which is simple and inexpensive to manufacture and which is rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a perspective view of an offset disc tiller having adjustment apparatus according to the present invention;

FIG. 2 is a fragmentary perspective view of the adjustment apparatus of the tiller of FIG. 1;

Like reference characters indicate corresponding parts throughout the several views of the drawings.

Figures 3, 4:
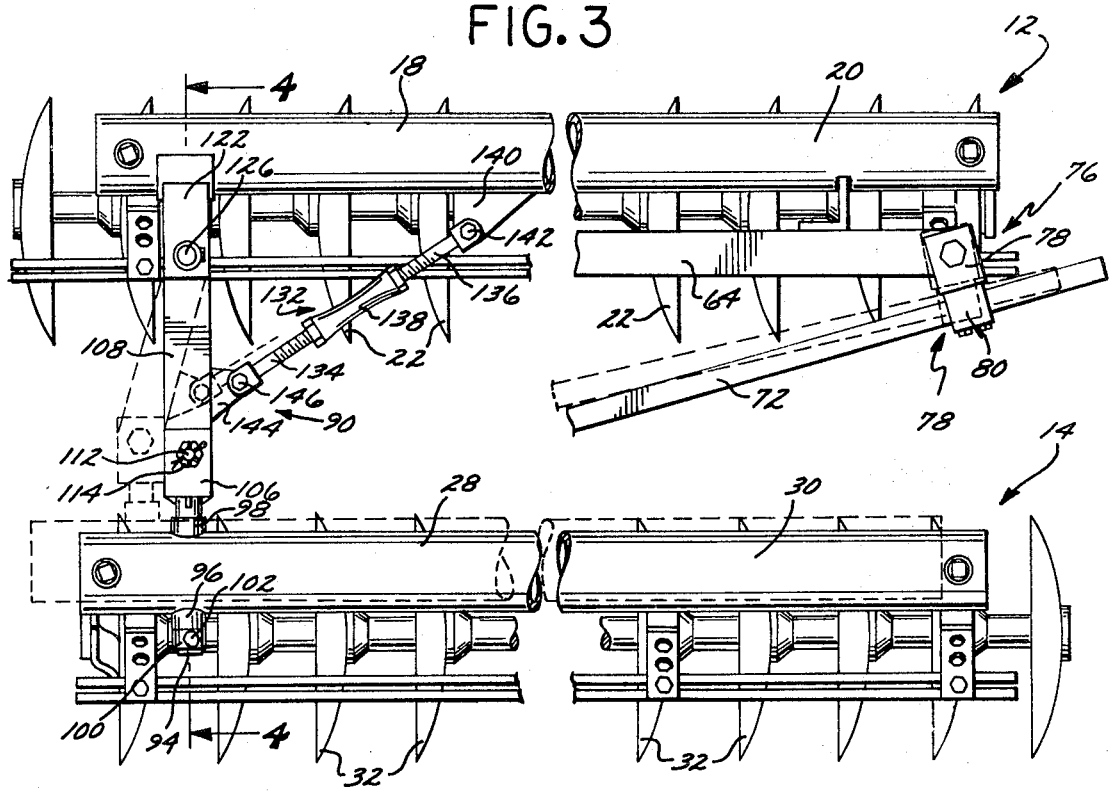
FIG. 3 is a fragmentary top plan view of such disc tiller, showing an adjustment in the relationship between the forward and rearward discs.
FIG. 4 is a sectional view, taken substantially along line 4—4 of FIG. 3.

Referring to FIG. 1 of the drawings, there is shown therein an offset disc tiller 10 comprising a forward disc unit 12 and a rearward disc unit 14.

Disc unit 12 comprises a frame 16, comprising frame members 18 and 20. Each such frame member may be formed of steel and may have a tubular configuration as shown most clearly in FIG. 2 of the drawings. Disc unit 12 further comprises a plurality of discs 22 which are connected to the respective frame members 18 and 20 in depending fashion by appropriate brackets as shown at 24. Such discs 22 are fixed to a shaft or other mounting means which is then arranged in depending relation to the aforementioned frame 16.

In similar fashion, the rearward disc unit 14 comprises a frame 26 having tubular steel frame members 28 and 30. Discs 32 are arranged in depending relation from said frame 26 by being mounted on a shaft, the latter of which is attached to the appropriate frame members by suitable brackets.

Although not an essential part of the present invention, the frame members 18 and 20 of the forward disc unit may be hingedly connected to each other at adjacent end portions 18a and 20a. Such hinge connection may take substantially any desired form such as shown in our co-pending application Ser. No. 559,282 for Automatic Alignment Apparatus for Disc Tillers, filed June 21, 1966. In like fashion, the adjacent end portions 28a and 30a of the frame members 28 and 30 of the rearward disc unit may be hingedly connected together, the primary object of such hinging being to enable the entire disc tiller to closely conform to the irregularities of the surface of the ground.

As also shown in our aforementioned co-pending application, the frame members 28 and 30 of the rearward unit 14 may be biased to an optimum relative position. That is, by means of suitable brackets 34 and 36 fixed respectively to end portions 28a and 30a, and by means of a pair of compression springs 38 and 40, the frame members 28 and 30 can be urged to any desired relative position.

This arrangement further comprises a shaft 42 one end of which is pivotally fixed to the bracket 36 by a clevis 44, while the intermediate portion of such shaft 42 extends through an appropriate opening in a pivotal bearing member 46 on bracket 34. Adjustment nut 48 is provided at one end of shaft 42 while nut 50 is provided at the other end to afford abutments for the springs 38 and 40, respectively.

Thus, with this arrangement, as the frame members 28 and 30 are caused to pivot with respect to each other, one or the other of springs 38 and 40 is operable to urge said members to a predetermined relative position.

The frame members 18 and 20 of the forward unit 12 are urged to optimum relative position by means of the spreader bar and associated parts described in our aforementioned co-pending application. Briefly, such arrangement comprises a spreader bar 52 which is connected to a draw bar 54. The opposite ends of spreader bar 52 are connected to suitable brackets 56 and 58, each of which comprises a pull rod 60. The spreader bar is connected to such pull rods at an elevation different from the elevation of the pivotal axis between the frame members 18 and 20. In this manner and by virtue of adjustment means described in detail in the aforementioned application, the forward pull of the motive power means on the draw bar 54 tends to urge the frame members 18 and 20 into optimum relative position.

To enable the disc units 12 and 14 to be varied in their angular offset relation, power-operated lever means 62 may be provided. Such lever means comprises a first control arm 64 pivotally connected to frame member 20 through a suitable bracket 66. Bracket 66 may comprise properly spaced arms 68 welded to frame member 20, and a pin 70 may be provided to pivotally connect one end of control arm 64 between such plates.

Another control arm 72 is connected to frame member 30 through a similar bracket 74. To effect connection between the arms 64 and 72 adjustable pivotal connection means 76 is employed. Such means comprises a clevis 78 pivotally connected to one end of arm 64 and a mounting block 80 formed with a through opening wherein control arm 72 is adjustably positioned. Suitable fastening bolts are used to fix the relationship between block 80 and control arm 72.

For automatic operation of the aforementioned lever mechanism 62, there is provided a hydraulic actuator 82. One end of such actuator is pivotally fastened relative to frame member 20 through a bracket 84, while the other end thereof is pivotally connected relative to control arm 64 through a bracket 86.

Hydraulic actuator 82 is connected by suitable conduits or flexible hose and the like (not shown) to a source of hydraulic fluid under pressure. Also, certain control instrumentalities (also not shown) are provided for proper control of actuator 82 by an operator.

Adjustable pivot means 90 is utilized to connect the end portions of frame members 18 and 28 as shown in the drawings. Such pivot means comprises a bracket 92 mounted on one end of frame member 28. As shown most clearly in FIG. 4 of the drawings, bracket 92 comprises a mounting shaft 94 positioned within horizontally aligned through openings formed laterally in the frame member 28. Suitable sleeve members 96 and 98 are welded on opposite sides of frame member 28 in alignment with such through openings to afford additional bearing surface for the shaft 94.

A collar 100 is mounted on the end 94a of shaft 94 in abutting relation to the sleeve 96. A fastening bolt 102 having a fastening nut 104 is positioned within aligned openings in such collar 100 and end portion 94a of shaft 94 to firmly secure such members together. Thus, collar 100 is operable to provide a firm bearing surface with sleeve 96 to retain the disc units in the desired relation against the strong forces which result from pulling of the disc tiller through the ground.

Firmly attached to the opposite end 94b of shaft 94 is a clevis 106. A connector bar 108 is pivotally connected to clevis 106, one end portion 108a thereof being positioned between the clevis and adjacent bearing members 110. A bolt 112 having a fastening nut 114 for receiving a cotter pin 116 is provided through the clevis arms, end portion 108a of connector arm 108 and spacers 110 as most clearly shown in FIG. 4.

The opposite end 108a of arm 108 is pivotally connected to a bracket 118, the latter of which is firmly fastened to frame member 18 as by welding or the like. Such bracket comprises an arcuate mounting member 120 and a pair of spaced arms 122 and 124. A pin 126 extends through suitable aligned openings in the arms 122 and 124, and through a suitable opening in end portion 108b of connector arm 108. Suitable fastening members 128 are secured to opposite ends of pin 126 by shear pins or bolts 130.

It is thus seen that the connector arm 108 is afforded pivotal connection relative to each of the forward and rearward disc units.

As shown most clearly in FIGS. 2 and 3 of the drawings, a manual adjustment device or link 132 is included as part of the aforementioned adjustment apparatus 90. Such device comprises a pair of stub assemblies 134 and 136, individually formed with a threaded shaft and a clevis firmly welded thereto. A buckle 138 is used to interconnect the stub assemblies 134 and 136, such buckle comprising an intermediate portion and threaded opposite end portions which cooperate with the respective threaded shaft.

The clevis of stub assembly 136 is pivotally connected to a bracket 140 by means of a pivot bolt 142. Such bracket is firmly secured to frame member 18 as by welding, brazing or the like.

The clevis associated with stub assembly 134 is pivotally connected to bracket 144 by means of pivot bolt 146. Such bracket 144 is firmly secured to connector arm 108 as by welding or the like. It is thus seen that by this arrangement it is possible to vary the angular disposition of connector arm 108 relative to frame member 18 as will hereinafter become more apparent.

When it is desired to alter the angular offset relation of the forward and rearward disc units, it is a simple matter to energize hydraulic actuator 82 so as to vary the relative position of the piston and cylinder thereof. Should it be desired to make a further adjustment of the angular offset relation, it is possible for the operator to vary the position of lever arm 72 within block 80.

With the disc units in their open condition, the disc tiller is to be pulled over and through the ground. In the event the ground is not left flat and level after being so worked, it is necessary to employ adjustment apparatus 90. That is, if the furrows left by the discs 22 of the forward unit 12 are not filled by the rearward discs 32, then the buckle 138 should be altered to change the location of the pivotal axis for relative movement of the rearward unit relative to the forward unit. That is, with the aforedescribed arrangement the bolt 112 affords the axis about which the disc units are pivoted as their angular offset relation is changed. By suitable manipulation of the adjustment apparatus or link 132 such pivot axis can be caused to follow an arc ascribed about the axis afforded by pivot pin 126.

As can be seen most clearly in FIG. 3 of the drawings, by altering such adjustment apparatus and thus moving the position of pivot bolt 112, the relationship between the forward and rearward discs is changed accordingly. As shown in such figure, by extending the adjustable link 132, the bolt 112 is moved from the solid line position to the dotted line position, and the frame 26 and discs 32 associated therewith are moved accordingly from the solid line to dotted line positions.

To insure that the buckle 138 remains in fixed position, suitable lock nuts may be employed on either end thereof.

This enables the operator to make the appropriate adjustment of the buckle or adjustment apparatus 132 and to firmly secure the same in place.

It is thus seen that the present invention provides adjustment apparatus for use with an offset disc tiller for adjusting the relative operating positions of the discs thereof.

Although we have shown and described certain specific embodiments of our invention, we are fully aware that many modifications thereof are possible.

We claim:

1. Adjustment apparatus for a disc tiller having forward and rearward disc units to be angularly offset comprising in combination, horizontally extending bracket means fixed to one end of one of said disc units, a shaft horizontally mounted in one end of the other disc unit, a bracket member fixed to one end of said shaft and extending toward said bracket means, an elongated connector link having its opposite ends pivotally mounted in said bracket means and bracket member respectively for pivotal movement about vertical axes, means operatively interconnecting said disc units remote from said bracket means and bracket member to open and close said disc units, a manual adjustment link interconnecting one of said disc units and said elongated connector link, said adjustment link being longitudinally adjustable to vary the angular disposition between said connector link and said one disc unit to thereby vary the lateral relative position of said disc units.

2. Adjustment apparatus for a disc tiller having angularly offset forward and rearward disc units according to claim 1, wherein each of said bracket means and bracket member is generally C-shaped individually affording a pair of horizontally disposed vertically offset arms, and a pivot pin is provided in each pair of arms to extend through an opening formed in the respective end of said connector between the arms of said bracket to permit pivotal movement of said connector link about a pair of of vertical axes.

3. Adjustment apparatus for a disc tiller having forward and rearward disc units to be angularly offset according to claim 1, wherein each of said bracket means and bracket members is a clevis disposed such that the aligned openings in each thereof vertically position the respective pivot pin, and said adjustment link is a turnbuckle which is operable to shorten or lengthen said link.

4. Adjustment apparatus for a disc tiller having forward and rearward disc units to be angularly offset comprising in combination, bracket means fixed to one end of said disc units, a shaft horizontally mounted in one end of the other disc unit, a bracket member fixed to one end of said shaft and extending toward said bracket means, a connector link having its opposite ends pivotally mounted in said bracket means and bracket member, means operatively interconnecting said disc units to open and close said disc tiller remote from said bracket means and said bracket member, and an adjustment link interconnecting one of said disc units and said connector link, said adjustment link being longitudinally adjustable independently of said opening and closing means to vary the angular disposition between said connector link and said one disc unit to thereby vary the lateral relative position of said disc units.

5. Adjustment apparatus for a disc tiller having forward and rearward disc units to be angularly offset according to claim 4, wherein said horizontal shaft extends through a frame member of said other disc unit, and a thrust bearing is fixed to the other end of said shaft to firmly position said shaft in said other disc unit.

6. Adjustment apparatus for a disc tiller having forward and rearward disc units to be angularly offset according to claim 5, wherein said shaft is rotatable in said other disc unit and said thrust bearing prevents longitudinal movement thereof while permitting said rotational movement.

7. Adjustment apparatus for a disc tiller having forward and rearward disc units to be angularly offset comprising in combination, bracket means fixed to one end of one of said disc units, a bracket member fixed to one end of the other of said disc units, a connector link having its opposite ends pivotally mounted in said bracket means and bracket member, means operatively interconnecting said disc units to open and close said disc tiller remote from said bracket means and said bracket member, and an adjustment link interconnecting one of said disc units and said connector link, said adjustment link being longitudinally adjustable independently of said opening and closing means to vary the angular disposition between said connector link and said one disc unit to thereby vary the lateral relative position of said disc units.

References Cited

UNITED STATES PATENTS

| | | | |
|---|---|---|---|
| 2,568,082 | 9/1951 | McKay | 172—596 X |
| 2,604,746 | 7/1952 | Frank et al. | 172—568 |
| 2,759,310 | 8/1956 | Newkirk | 172—597 X |
| 2,897,905 | 8/1959 | McCleskey | 172—581 |
| 3,033,295 | 5/1962 | Brundage | 172—597 |

ROBERT E. PULFREY, Primary Examiner

S. C. PELLEGRINO, Assistant Examiner

U.S. Cl. X.R.

172—568